United States Patent
Bons et al.

(10) Patent No.: US 7,262,245 B2
(45) Date of Patent: Aug. 28, 2007

(54) LOW-DENSITY SEALING MASS, GROUND MASS AND METHOD FOR PRODUCING THE SAME AND THE USE THEREOF

(75) Inventors: Peter Bons, Reichelsheim (DE); Heinz Burock, Niedernhausen (DE); Francisco Diez, Moerfelden-Walldorf (DE); Andrea Paul, Mainhausen (DE); Heiko Diehl, Sankt Martin (DE)

(73) Assignee: Chemetall GmbH, Frankfurt am Main (DE)

( * ) Notice: Subject to any disclaimer, the term of this patent is extended or adjusted under 35 U.S.C. 154(b) by 0 days.

(21) Appl. No.: 10/472,266

(22) PCT Filed: Apr. 5, 2002

(86) PCT No.: PCT/EP02/03815

§ 371 (c)(1),
(2), (4) Date: Dec. 10, 2003

(87) PCT Pub. No.: WO02/081560

PCT Pub. Date: Oct. 17, 2002

(65) Prior Publication Data

US 2004/0097643 A1      May 20, 2004

(30) Foreign Application Priority Data

Apr. 6, 2001   (DE) ................................. 101 17 251

(51) Int. Cl.
*C08L 81/04* (2006.01)

(52) U.S. Cl. ...................... 524/609; 525/537; 528/373; 528/480

(58) Field of Classification Search ................ 524/609; 525/537, 373, 343, 480
See application file for complete search history.

(56) References Cited

U.S. PATENT DOCUMENTS 5,663,219 A    9/1997  Potts et al.

FOREIGN PATENT DOCUMENTS

EP     0 268 837 A     6/1988
WO     WO-98 39365 A   9/1998

*Primary Examiner*—Duc Truong
(74) *Attorney, Agent, or Firm*—Fulbright & Jaworski L.L.P.

(57) ABSTRACT

The invention relates to a sealing mass with low density and improved tensile strength on the basis of sulfur-containing polymers such as on the basis of polysulfide, polyether or/and polytioether that has a density of not more than 1.3 g/cm$^3$ according to ISO 2781 and a tensile strength of at least 1.9 N/mm$^2$ according to ISO 37 after curing. The invention further relates to a ground mass based on sulfur-containing polymers for producing a sealing mass that comprises at least one long-chain linear polymer and at least one short-chain branched polymer having a content in trifunctional molecules, or/and at least one multifunctional cross-linker with a number of functional groups $n \geq 3$. The invention further relates to a method for producing a sealing mass according to which at least one base polymer is mixed with at least one adhesion promoter and the at least one light filler, especially hollow filler, is added, a vacuum with a remaining pressure of less than 50 mbar being maintained during incorporation of the light filler.

60 Claims, No Drawings

LOW-DENSITY SEALING MASS, GROUND MASS AND METHOD FOR PRODUCING THE SAME AND THE USE THEREOF

The invention relates to a low-density sealing composition with increased tensile strength based on sulfur-containing polymers and also an accompanying base composition and a process for their manufacture.

The sealing composition of the invention is intended to serve in particular for the bonding or gluing of parts and/or the sealing or filling of cavities and interstices. This is of particular interest in aviation and space travel, but also anywhere where, as a result of a larger quantity of sealing compositions, particular attention must be paid to the weight used, in other words to the density of the sealing compositions, as e.g. with land vehicles.

Sealing compositions are now used for the widest variety of applications. They serve in particular for the sealing of construction elements, the gluing e.g. of sheets to existing structures such as e.g. sections of an aircraft or to protect against corrosion in areas where the anti-corrosion layers of metal elements have been damaged or removed e.g. in the vicinity of drill holes and may temporarily assume a supporting function e.g. during the transport of structures under construction, which are subsequently fitted with permanent supporting joining elements.

In principle, two process variants are possible for manufacturing low-density sealing compositions: Either hollow filling bodies are used which, as a result of a gas-filled cavity, are manufactured with a very low density. Or fillers in compact form can be added which, as a result of their low density in comparison with the density of the other components of the sealing composition, such as e.g. inorganic fillers, are particularly light and thus help to reduce the density overall. However, to the knowledge of the applicant, the production of lightweight sealing compositions has reached its limit at a minimum of 1.30 $g/cm^3$, as the base polymer itself has a density in the range of 1.0 to 1.3 $g/cm^3$ and as the fillers used hitherto have a density approximately in the range of 2 to 4 $g/cm^3$.

Particular demands are now made of sealing compositions for the production and maintenance of air- and spacecraft. As a result of their use in the sealing of fuel tanks, protection against corrosion, aerodynamic smoothing and sealing of the pressure hull, great emphasis is placed on elasticity over a wide temperature range, resistance to various media such as e.g. fuel, hydraulic fluid, condensation and anti-freeze fluid and a good sealing and bonding action on the widest variety of substrates.

In addition, in the case of interlayer sealing compositions, it is desirable that such compositions have no hollow bodies or cavities.

It can be assumed that ca.1000 to 2000 kg sealing compositions are used in the construction of an airliner. If, therefore, the density of these sealing compositions could be reduced by e.g. 10 to 30%, this would result in a tangible reduction in weight: e.g. from a density of ca.1.5 $g/cm^3$ to ca.1.28 $g/cm^3$ or in some cases even to ca.1.1 $g/cm^3$.

U.S. Pat. No. 5,663,219 discloses a sealing composition based on polysulfide, the sealing composition having a density in the range 1.0 to 1.3 $g/cm^3$ and a peel strength in the range above 17 pounds per linear inch. This specification gives a density below 1.3 $g/cm^3$ only once in the examples, namely 1.1 $g/cm^3$ in example 1, but gives no further mechanical typical data for this. On the basis of the remaining data and knowledge of the formulations, it is assumed that the peel strength of this sealing composition is rather low. The best average value given for peel strength, which is given for example 10, is 28.3 pounds per linear inch (a 124 N/25 mm). No tensile strength data are given for this.

The object was therefore to propose a sealing composition with as low a density as possible, but at the same time with good mechanical properties and a manufacturing process for these sealing compositions that is as simple as possible, and that can be manufactured with polymers that are as economic as possible and that also has a wide variety of applications. Above all, these sealing compositions should also be extremely suitable for use in aerospace applications.

The object is achieved by a sealing composition of low density and increased tensile strength based on sulfur-containing polymers such as e.g. on polysulfide, polyether and/or polythioether, which is characterised in that it has a cured density of no more than 1.3 $g/cm^3$ determined to ISO 2781 and a tensile strength of at least 1.9 $N/mm^2$ determined to ISO 37.

For the sake of linguistic simplicity, the term sealing composition in the context of this invention is used below in some cases in such a way that it comprises, in addition to the cured sealing composition, also the concept of the base composition and the base composition when mixed with the hardener (e.g. based on manganese dioxide with accelerators, wetting agents etc). The term base composition describes a mixture which after mixing with the hardener and after curing with the hardener is normally understood to be a sealing composition. A content of hardener in relation to base polymer in the range of 5:100 to 15:100 is mostly used.

The sulfur content of the sealing compositions according to the invention may already be contained in the base polymer—e.g. in the polysulfide, polythioether or polyether with individual sulfur bridges (as single and/or double bridges), or may be introduced by means of the terminal mercapto groups. The base composition comprises the base polymer of the sealing composition according to the invention, into which the other components are mixed or have been mixed. The proportion of the base polymer in the total sealing composition is conventionally 50 to 85 wt. %, preferably 55 to 82 wt. %, particularly preferably 62 to 78 wt. %. A higher proportion of fillers and/or hollow filling bodies is to be added to the base polymer, on the one hand to reduce the density as far as possible and on the other to set the highest possible mechanical properties. The base polymer mostly has a density in the range of 1.0 to 1.4 $g/cm^3$, in the case of the polysulfide base polymer approximately of 1.29 $g/cm^3$. The chain length of the base polymer may preferably be in the range of 1000 to 8000 g/mol, particularly preferably in the range of 2000 to –5000 g/mol, most preferably in the range of 2500 to 4500 g/mol. The chains of the base polymer may be purely linear or crosslinked to a limited extent. The proportion of crosslinking is preferably 0 to 90%, in particular 20 to 80%, most particularly at least 40% or up to 70%, in each case in relation to the number of the chains, the molecular weight in relation to the percentage by weight being taken into account.

Surprisingly, it was found that at least one long-chain linear polymer (e.g. at least one linear polysulfide with a chain length in the range approximately of 1500 to 5000 g/mol, in particular in the range approximately of 2000 to 4500 g/mol such as e.g. LP 541 from Rohm & Haas or G 10 from Akzo Nobel) in combination with at least one short-chain, branched polymer (e.g. at least one branched polysulfide with a chain length in the range approximately of 500 to 2000 g/mol, preferably in the range approximately of 800 to 1500 g/mol, in each case with a content of trifunctional molecules in the range of 0.1 to 5 mol %, in particular with a content in the range of 0.5 to 2 mol %, such as e.g. LP 3, LP 33 from Rohm & Haas or G 44, G 4 from Akzo Nobel) and/or at least one polyfunctional crosslinker—optionally partially or wholly as a substitute for the short-chain polymers—with the number of functional groups $n \geq 3$, produces particularly good mechanical properties. Preferably n=3 and/or 4, but in principle can also take on values of n=3, 4, 5, 6, 7 and/or 8, but rarely values for n greater than 8. The polyfunctional crosslinker may be mercapto-functional e.g. as in the case of pentaerythritol-tetrakis-3-mercaptopropionate, trimethylolpropane mercaptopropionate or trimethylolpropane trimercaptoacetate from Bruno Bock, or epoxy-functional as in the case of the triglycidyl propylamino phenol TGPAP from Shell, Araldit® MY 0500 and Araldit® XU MY 0505 from Ciba or DEN 431 from Dow. The content of crosslinkers may vary from 0 to 5 wt. %, preferably, where crosslinkers are added, 0.1 to 3 wt. %, particularly preferably no more than 0.5 wt. %. The chemical variants of the base polymer and the crosslinker are known in principle to the person skilled in the art.

In addition, the base composition may contain at least one adhesion promoter. This serves to bind the fillers and hollow filling bodies into the polymer and to aid adhesion to the substrate. Where used, it is normally contained in a total quantity of 0.1 to 8 wt. %.

Furthermore, the base composition may contain at least one mineral filler. This may be a filler e.g. based on aluminium oxide, aluminium hydroxide, chalk, silica, silicates and/or sulfates. The total content of these may vary from 0 to 49 wt. %, preferably 1 to 40 wt. %, particularly preferably at least 2 wt. % or up to 30 wt. %, most particularly preferably at least 5 wt. % or up to 25 wt. %.

Furthermore, where needed, it may contain in particular at least one each of a rheological additive to establish e.g. the thixotropy and/or the flow properties, a biocide, a corrosion inhibitor or an additive with a different action.

In addition, the object was achieved with a base composition based on sulfur-containing polymers for the manufacture of a sealing composition, which is characterised in that it contains at least one long-chain linear polymer, in particular at least one linear polysulfide with a chain length in the range for instance of 1500 to 5000 g/mol, and at least one short-chain, branched polymer, in particular at least one branched polysulfide with a chain length in the range approximately of 500 to 2000 g/mol, which has a content of trifunctional molecules, in particular in the range of 0.1 to 5 mol % and/or at least one polyfunctional crosslinker with the number of functional groups $n \geq 3$. Instead of the content of trifunctional molecules, higher-functional molecules may in principle also be used at the same time or as an alternative in particular up to n=8. The linear polysulfide preferably has a larger proportion, largely or even wholly, of a linear chain with a functionality of 2, i.e. two terminal functional groups.

Furthermore, the object was achieved with a base composition based on sulfur-containing polymers for the manufacture of a sealing composition, which has a density before the addition of a hardener not exceeding a value of 1.285 g/cm$^3$, in particular a value of up to 1.28 g/cm$^3$, preferably a value of up to 1.26 g/cm$^3$, most preferably of up to 1.23 g/cm$^3$, above all a value of up to 1.18 g/cm$^3$, in particular a value of up to 1.12 g/cm$^3$.

The density e.g. of the liquid base polymer can be measured as a true density on a pycnometer to DIN 53479 of July 1976. The density of the cured sealing composition can be determined to ISO-2781 of December 1988 using a minimal quantity of a surfactant in distilled water according to the Archimedes principle. If the cured sealing composition contains hollow filling bodies, its density may lie in the range of 0.8 to 1.29 g/cm$^3$, preferably in the range of 0.85 to 1.27 g/cm$^3$, in particular in the range of 0.9 to 1.24 g/cm$^3$, above all in the range of 0.95 to 1.20 g/cm$^3$.

The tensile strength was measured on dumb-bell-shaped test bodies of cured sealing composition of the size of Type 2 with a tension speed of 500 mm/min to ISO 37 of May 1994 in a Universal test machine. The tensile strength may be at least 2.0 N/mm$^2$, preferably at least 2.05 N/mm$^2$, particularly preferably at least 2.15 N/mm$^2$, above all at least 2.25 N/mm$^2$ (=MPa).

The sealing composition according to the invention may also have a peel strength of at least 90 N/25 mm, preferably of at least 125 N/25 mm. The peel strength represents the internal strength and in particular the adhesion of a cured sealing composition to substrates.

It was determined on specimens of cured sealing composition to AITM 2-0013 with special steel wire cloth.

Surprisingly high values for peel strength and at the same time high values for tensile strength were achieved, even without adding epoxidated polysulfides such as e.g. ELP-3 (given in U.S. Pat. No. 5,663,219). If a sealing composition according to the invention is manufactured with an epoxidated polysulfide (=polysulfide with terminal functional epoxide groups, so that there is no mercapto functionality), no positive influences on tensile strength are produced to the knowledge of the applicant.

Surprisingly however, it was found that high tensile strengths combined with high peel strength values can be achieved at low densities even without the use of special polymers such as e.g. Permapol® P-5 or epoxidated polysulfides. However, both the epoxidated polysulfides and the special polymers such as e.g. Permapol® P-5 are significantly more expensive than conventional polysulfides, as they require a laborious additional production step. It is therefore advantageous that unmodified polysulfides are sufficient for most of the sealing compositions according to the invention.

The sealing composition according to the invention may contain a proportion of lightweight polymeric strength-increasing filler such as e.g. polyamide, polyethylene, polypropylene. This filler is preferably added in powder form, optionally as a mixture of at least two different fillers. The average particle size of the filler powder may be in the range of 0.5 to 80 µm, preferably in the range of 1 to 40 µm, particularly preferably in the range of 1.2 to 30 µm, most preferably in the range of 1.5 to 20 µm. It may be advantageous to use a powder that has been surface-modified e.g. by corona treatment or by another activating treatment such as e.g. treatment of the filler surface with silanes. Surface modification can achieve an improved bonding of the polymeric powder into the sealing composition and thus improved mechanical properties. Functional groups which facilitate bonding into the base polymer, such as e.g. polysulfide, should thus be made available on the surface of the powder particles. The proportion of lightweight polymeric strength-increasing filler, where this is not hollow filling bodies, may amount to 0 to 35 wt. %, the hollow filling body-free sealing compositions preferably having 10 to 25 wt. %, particularly preferably 14 to 22 wt. %. If at least one type each of hollow filling bodies and lightweight polymeric strength-increasing fillers is used simultaneously, the sum of the contents is 0.3 to 35 wt. %, preferably 5 to 20 wt. %.

The density of the sealing composition according to the invention may, without a proportion of hollow filling bodies, be no more than 1.30 g/cm³. A density of no more than 1.28 g/cm³ is preferably achieved, particularly preferably a density of no more than 1.26 g/cm³. The density of the base composition according to the invention may, without a proportion of hollow filling bodies, have a value of no more than 1.285 g/cm³, in particular a value of up to 1.28 g/cm³, preferably a value of up to 1.27 g/cm³, most preferably of up to 1.25 g/cm³, above all a value of up to 1.22 g/cm³, in particular a value of up to 1.19 g/cm³.

The true density of these fillers, without taking account of hollow filling bodies, normally lies approximately in the range of the accompanying polymers and thus mostly in the range approximately of 0.8 to 1.3 g/cm³. The polymeric filler powders may have a true density in the range of 0.5 to 1.5 g/cm³. The inorganic filler powders may have a true density in the range of 0.18 to 4.5 g/cm³. The latter powders may, in some cases, have a closed porosity. The density of the fillers, which are not hollow filling bodies, may be determined to DIN 53479 of July 1976 using a minimal quantity of a surfactant in de-gassed deionised water in a pycnometer.

The density of the hollow filling bodies may be determined in a similar way, however using a graduated measuring cylinder with a notched plunger, which is pressed onto the surface of the volume of water containing the hollow filling bodies to remove the contained air, the measuring cylinder which is closed with the notched plunger having been shaken previously to disperse the hollow filling bodies whilst avoiding foam formation.

The sealing composition according to the invention may have a proportion of hollow filling bodies such as e.g. polymeric hollow spheres in the range of 0.3 to 10 wt. %. The proportion of hollow filling bodies is preferably in the range of 0.5 to 5 wt. %. Here a proportion of e.g. 2 wt. % hollow filling bodies may constitute a proportion by volume of the sealing composition in the range of 15 to 35 vol. %, depending on the type of hollow filling body. The addition of hollow filling bodies helps to reduce the density of the sealing composition relatively significantly because of the extraordinarily low true density of the hollow filling bodies.

The sealing composition according to the invention may have hollow filling bodies with an average diameter of no more than 50 µm, in particular those of no more than 30 µm, measured under a light microscope, the particles lying largely scattered on the slide.

The hollow filling bodies may have a true density in the range of 0.001 to 0.8 g/cm³. The true density is preferably 0.01 to 0.6 g/cm³, particularly preferably 0.02 to 0.3 g/cm³. Hollow filling bodies may, in principle, consist of any material and may optionally additionally be coated. They preferably consist substantially of a ceramic material, of glass or of an organic material such as e.g. of an aluminium-containing silicate. In particular, they consist substantially of a polymeric material e.g. based on acrylonitrile copolymer or methacrylonitrile copolymer. The shape of the hollow filling bodies is preferably substantially spherical. The average diameter of the hollow filling bodies is preferably in the range of 2 to 100 µm, in particular in the range of 5 to 45 µm.

Here, lightweight filling bodies and optionally also fillers with an average particle size of no more than 30 µm, preferably of no more than 20 µm, may be used to achieve better spreadability and mouldability of the sealing composition during processing.

If the average diameter of the hollow filling bodies is too large, the sealing composition will no longer be homogeneously composed and accordingly will form inhomogeneous surfaces on curing, which restricts possible applications, or the sealing composition will not achieve the desired high mechanical properties. The wall thickness of the hollow filling bodies may vary significantly, but is preferably low, to produce a lower density of the sealing composition. Astonishingly, even extremely thin-walled hollow filling bodies have scarcely ever been pulverised in spite of severe mechanical attack during mixing of the individual components of the sealing composition. The hollow filling bodies are preferably filled with air, certain gases such as e.g. nitrogen or carbon dioxide, isobutane, n-pentane, isopentane and/or other waste gases from the manufacturing process.

The density of the sealing composition according to the invention that contains hollow filling bodies may lie in the range of 1.3 to 0.7 g/cm³, in particular in the range of less than 1.28 g/cm³, preferably less than 1.25 g/cm³, particularly preferably less than 1.22 g/cm³, particularly preferably less than 1.18 g/cm³, in particular less than 1.12 g/cm³, above all less than 1.06 g/cm³.

If a suitable base polymer, adhesion agent and polymeric filler are selected, surface modification of the polymer powder is not necessary, although it could be beneficial, because a certain level of strength is already achieved as a result of this selection. When adding the hollow filling bodies, the addition of structure-forming inorganic fillers for the formation of good mechanical properties is preferred to the use of the polymeric filler powders. The surface properties of the polymeric filler powders have a far greater influence on the quality of the sealing compositions produced with them than the selection of the chemical type of the polymer of the polymeric filler powders.

However, in most cases, the higher the tensile strength selected for such sealing compositions, the lower the peel strength of these sealing compositions. Surprisingly, it was found that this opposing correlation can be avoided to a greater extent only if the sealing composition is manufactured by the process according to the invention.

The composition of the sealing composition according to the invention is otherwise known in principle. The sealing composition according to the invention may, before and after curing, additionally contain a corrosion inhibitor, in particular a chromate-free corrosion inhibitor.

For aerospace applications, it is extremely important to comply with the requirements of the specifications AIMS 04-05-001 General Purpose Specification, AIMS 04-05-002 Fuel Tank Specification and where possible also the more stringent Fuel Tank Specification AIMS-04-05-012. To the knowledge of the applicant, it is extremely difficult to fulfil the minimum tensile strength requirement of 2.0 N/mm² determined to ISO 37 of May 1994 in the Airbus Industries Material Specification AIMS-0405-012. Furthermore, achieving, the minimum peel strength of the cured sealing composition of 120 N/mm² after one thousand hours' immersion in deionised water at 35° C. in accordance with AIMS-04-05-012 of November 1997 determined to AITM 2-0013 of June 1995 is problematic. It is also difficult to achieve the minimum peel strength of the cured sealing composition of 120 N/mm² after three periods of one hundred hours each of immersion in jet fuel DERD 2494 at 100° C. according to AIMS-04-05-012 determined to Airbus Industries Test Method AITM 2-0013. Most of the sealing compositions according to the invention even fulfil all of the requirements of all these specifications. This includes also a minimum tensile strength of 2.0 N/mm² determined to ISO 37 of May 1994 in combination with a peel strength ˆ(Peel) of at least 120 N/25 mm determined to AITM 2-0013 of June 1995 and in combination with a density of up to 1.30 g/cm$^3$ determined to ISO 2781 of December 1988.

To the knowledge of the applicant, no single fully cured sealing composition has hitherto actually fulfilled all of the requirements of the specification AIMS 04-05-001 of November 1996 and also AIMS 04-05-012 of November 1997, which are significantly higher than those of AIMS 04-05-002 of November 1996.

The cured sealing composition according to the invention can fulfil low-temperature flexibility at −55° C. determined to ISO 1519. This is determined by bending a sheet coated with sealing composition over a mandrel, during which process the sealing composition must remain crack-free; the mandrel has a diameter of 10 mm.

The cured sealing composition according to the invention can have a peel strength of at least 120 N/mm after one thousand hours' immersion in deionised water at 35° C. determined to AITM 2-0013.

The cured sealing composition according to the invention can have a peel strength of at least 120 N/MM$^2$ after three periods of one hundred hours each of immersion in jet fuel DERD 2494 at 100° C., determined to AITM 2-0013.

The cured sealing composition according to the invention can fulfil all the requirements of the specifications AIMS-04-05-001 and AIMS-04-05-012. It preferably fulfils all the requirements of these specifications, whilst also exceeding numerous limits such as density, tensile strength and peel strength as stated.

The object is also achieved by a process for the manufacture of a sealing composition, which is characterised in that at least one base polymer is mixed with at least one adhesion promoter and then the at least one lightweight filler, in particular hollow filling bodies, is added, a vacuum with a residual pressure of less than 50 mbar, preferably less than 10 mbar, being applied when working in the lightweight filler.

All or some of the other fillers and/or crosslinkers and further additives may each be added before and/or after the at least one lightweight filler is mixed in. With the other fillers however, it is preferable for at least part of them to be added only after mixing in the at least one lightweight filler. It may be advantageous if those fillers that are not readily wettable, and/or have a particularly large specific surface area, are added before the addition of the lightweight fillers and mixed with the polymers, but that those that are readily wettable, and/or have a comparably small specific surface area, are not added and intermixed until afterwards.

Mixing may in principle be carried out in one or more units in series. Here it is important that the base polymer and adhesion promoter are first mixed homogeneously with each other and lightweight filling bodies are then admixed. The air content of the mixture thus formed must be removed as fully as possible, to achieve good wetting and intermixing of the individual components. Evacuation may take place, if necessary, in another unit. However, it is advantageous to mix intensively and evacuate at the same time. To remove as much as possible of the air adhering to the lightweight fillers and to wet the lightweight fillers as well as possible with the base polymer and the adhesion promoter. Surprisingly it was found that the mechanical stability of the hollow filling bodies is so great that they can be mixed and worked in even with particularly severely and rapidly attacking mixing units, such as e.g. a dissolver, in particular a vacuum dissolver, at a high speed, without being destroyed.

With the process according to the invention for the manufacture of a sealing composition, the lightweight filler can be worked in in a laboratory scale vacuum dissolver at a peripheral toothed disc speed in the range of at least 2 m/s, in particular of at least 3 m/s, particularly preferably in the range of 5 to 15 m/s. With the process according to the invention for the production of a sealing composition the lightweight filler can be worked in in a production scale vacuum dissolver at a peripheral toothed disc speed in the range of at least 5 m/s, in particular of at least 10 m/s, particularly preferably in the range of 12 to 30 m/s. Astonishingly, the hollow filling bodies were not destroyed even with a very severe attack in the range of 18 to 22 m/s, but were so well wetted and homogeneously worked in that the mechanical properties of the sealing composition formed significantly improved in comparison with lower peripheral speeds and also with alternative conventional processes for the manufacture of such sealing compositions.

In the process according to the invention, the other components of the sealing composition can then be introduced and intermixed and evacuation can optionally take place during and/or after this process.

The non-cured or cured sealing composition according to the invention can be used in particular for the construction and maintenance of air- and spacecraft and for motor and rail vehicles, in shipbuilding, in apparatus engineering and mechanical engineering, in construction and civil engineering or for the manufacture of furniture.

EXAMPLES

The subject of the invention is explained in more detail below with the aid of embodiments.

General manufacturing instructions for the lightweight sealing compositions:

First the base polymers Thioplast® G 10 and Thiokol® LP 33 and the adhesion agents Methylon Resin 75108 and Nafturan® 8187 were provided. After the addition of lightweight fillers such as e.g. Acumist®, Dualite®, Expancel®, Rilsan® and/or Vestosint® and Aerosil® R 202 as a structure-providing filler, the components were mixed for 5 minutes under full vacuum (<50 mbar, if possible <10 mbar) in a dissolver at a peripheral speed of ca. 3 m/sec. The chalk Winnofil® SPT or Polcarb® S was then added as a structure-providing filler and the base composition was dispersed for 10 minutes at a peripheral speed of ca. 3 m/sec under vacuum (<50 mbar, if possible <10 mbar). The vacuum was applied slowly and mixing continued until as much as possible of the waste gases had been drawn off, which could be recognised also by the fact that after a significant increase in volume, the base composition collapsed again.

If the recipe provides for the addition of deionised water, a cooling phase of 5 minutes followed, in which the material was stirred whilst cooling under full vacuum (<50 mbar, if possible <10 mbar) at a peripheral speed of ca.1 m/sec. In the final step, deionised water was added after cooling and homogenisation took place for 5 minutes at a peripheral speed of ca.1 m/sec and a negative pressure of 400 to 600 mbar with renewed cooling. The base compositions were then left to stand for at least 1 day, before they were ready for use.

To manufacture the test bodies, the hardener Naftoseal® MC-238 B-2 was added to the relevant base composition at a ratio of 100:10 and the two were mixed homogeneously, so that they formed a sealing composition. After curing, i.e. after 14 days at 23° C. and 50% relative humidity in air, the properties of the test bodies were determined. They were determined as stated previously in the description.

Test Series A:

This test series illustrates the influence of the manufacturing process. The base and sealing compositions according to the invention were manufactured according to the instructions given above, whilst the reference examples were manufactured according to the conventional manufacturing method:

TABLE 1

Specific density and average particle sizes of the lightweight fillers used according to the manufacturers' data

| Lightweight filler | Specific density g/cm$^3$ | Average particle size μm |
|---|---|---|
| Acumist ® A-6 | 0.99 | 6 |
| Rilsan ® D 30 naturelle | 1.04 | 20-30 |
| Vestosint ® 2070 | 1-1.2 | 5 |
| Vestosint ® S 7126 | 1-1.2 | Not determined |
| Expancel ® 551 DE 20 | 0.06 | 15-25 |
| Expancel ® 461 DE | 0.06 | 20-40 |
| Dualite ® 6033 | 0.13 | 25 |
| Dualite ® 6032 | 0.13 | 70 |
| Expancel ® 091 DE | 0.03 | 35-55 |

The first four lightweight fillers belong to the class of polymer powders, the rest to the class of hollow filling bodies. The polymer powders were used in test series B and the hollow filling bodies in test series A and C. Aerosil® R 202, Polcarb® S and Winnofil® SPT are mineral fillers.

TABLE 2

Recipes for an improved manufacturing process in wt. %

| Raw material | Ex 1 | Ex 2 | Ex 3 | Ex 4 |
|---|---|---|---|---|
| 1. Thioplast ® G 10 | 74.78 | 74.78 | 74.78 | 74.78 |
| 2. TTMA | 0.21 | 0.21 | 0.21 | 0.21 |
| 3. Methylon Resin 75108 | 1.60 | 1.60 | 1.60 | 1.60 |
| 4. Nafturan ® 8187 | 1.64 | 1.64 | 1.64 | 1.64 |
| 5. Polcarb ® S | 18.29 | 18.29 | 18.29 | 18.29 |
| 6. Aerosil ® R 202 | 1.78 | 1.78 | 1.78 | 1.78 |
| 7. Expancel ® 551 DE 20 | 1.68 | 1.68 | 1.68 | 1.68 |

TTMA = Trimethylol propane trimercaptoacetate (mercapto-functional crosslinker)

Manufacturing Process for Ex 1:

The base composition without lightweight filler was manufactured in the conventional way, so that first all liquid components and then all fillers except the lightweight fillers are added, mixing and evacuation being carried out in between and/or at the end. The low-density filler was then added and was intermixed at a peripheral speed of ca.1 m/s. The material was then de-aerated at a residual pressure of ca.200 mbar.

Manufacturing Process for Ex 2:

The base composition without lightweight filler was manufactured in the conventional way as for Ex 1. The low-density filler was then added and intermixed at a peripheral speed of ca.1 m/s. The material was then deaerated at a residual pressure of <50 mbar.

Manufacturing Process for Ex 3:

All components were added in weighed portions, without intermediate mixing and were then dispersed for 15 minutes at a peripheral speed of ca.3 m/s and at a vacuum of well below 50 mbar.

Manufacturing Process for Ex 4:

The composition was manufactured according to the independent process claim of the invention, which means that the base polymer based on long-chain linear polysulfide Thioplast® G 10 was added with the adhesion promoters Methylon Resin 75108 and Nafturan® 8187 and mixed and the lightweight filler Expancel® 551 DE 20 (=hollow filling body) and the filler Aerosil® R 202 were then added, a vacuum with a residual pressure well below 50 mbar and a peripheral speed of ca. 3 m/s being applied whilst the lightweight filler was worked in. The remaining components (see table 2) were then added and mixed under a vacuum of well below 50 mbar and at a peripheral speed of ca. 3 m/s.

TABLE 3

Results of the measurements on the reacted sealing compositions for an improved manufacturing process

| Test | Ex 1 | Ex 2 | Ex 3 | Ex 4 |
|---|---|---|---|---|
| Density [g/cm$^3$] | 1.06 | 1.08 | 1.10 | 1.09 |
| Tensile strength [N/mm$^2$] | 1.95 | 2.34 | 2.35 | 2.39 |
| Elongation [%] | 291 | 381 | 413 | 413 |
| Peel 14 d RT [N/25 mm] | 178 | 188 | 195 | 224 |

These tests showed that Ex 4, which is according to the invention not only as a result of the properties of the cured sealing composition, but also as a result of the manufacturing process, achieved the best physical properties of the cured sealing compositions in test series A.

Surprisingly, the new manufacturing process, above all the high negative pressure and intensive wetting of the lightweight fillers with the base polymer and with the adhesion promoter, had a significant influence on the properties of the cured sealing compositions.

Test Series B:

This test series illustrates the manufacture of base-and sealing compositions using polymeric powders as lightweight fillers. The sealing compositions were manufactured according to the manufacturing instructions according to the invention in the same way as Ex 4, other chemical components being used in some cases.

TABLE 4

Recipes using polymeric lightweight fillers with addition quantities in wt. %

| Raw material | Ex 5 | Ex 6 | Ex 7 | Ex 8 | Ref 1 |
|---|---|---|---|---|---|
| Thioplast ® G 10 | 50.11 | 52.00 | 49.67 | 51.81 | 49.57 |
| Thiokol ® LP 33 | 20.00 | 17.48 | 19.87 | 17.41 | 19.84 |
| Methylon Resin 75108 | 1.62 | 1.62 | 1.84 | 1.61 | 1.61 |
| Nafturan ® 8187 | 1.50 | 1.50 | 1.49 | 1.49 | 1.49 |
| Acumist ® A-6 | 8.50 | 17.00 | — | — | — |
| Rilsan ® D 30 naturelle | 9.80 | — | 19.58 | — | — |
| Vestosint ® 2070 | — | — | — | 16.93 | — |
| Vestosint ® S 7182 | — | — | — | — | 19.84 |
| Winnofil ® SPT | 7.70 | 9.00 | 6.16 | 8.96 | 5.46 |
| Aerosil ® R 202 | 1.40 | 1.40 | 1.39 | 1.39 | 1.79 |
| Water | — | — | — | 0.40 | 0.40 |

Thiokol ® LP 33 is a short-chain, branched polysulfide base polymer. The water used was always deionised water.

TABLE 5

Results of measurements on the reacted sealing compositions manufactured according to the formulations of Table 4

| Test | Ex 5 | Ex 6 | Ex 7 | Ex 8 | Ref 1 |
|---|---|---|---|---|---|
| Density [g/cm³] | 1.28 | 1.26 | 1.30 | 1.30 | 1.32 |
| Tensile strength [N/mm²] | 2.24 | 2.10 | 2.41 | 2.00 | 1.76 |
| Elongation [%] | 285 | 288 | 282 | 283 | 292 |
| Peel 14 d RT [N/25 mm] | 190 | 263 | 126 | 262 | 135 |

It was surprising that, in spite of the comparatively small proportions of reinforcing mineral fillers (Aerosil® R 202 and Winnofil® SPT), high tensile strengths could still be achieved.

Surprisingly it was found that in addition, the sealing compositions filled only with small proportions of reinforcing mineral fillers and otherwise with polymer powders also achieved good adhesion to a wide variety of substrates (metals, a wide variety of lacquers) in conjunction with high mechanical typical values.

Although the base polymer had a density of ca.1.28 g/cm³, the examples according to the invention of test series B were found, as expected, to have a sealing composition density of $\leq 1.30$ g/cm³ even without the use of hollow filling bodies.

Test Series C:

This test series illustrates the manufacture of base or sealing compositions using polymeric hollow filling bodies as lightweight fillers. The sealing compositions were manufactured according to the manufacturing instructions according to the invention in the same way as Ex 4, other chemical components being used in some cases.

TABLE 6

Recipes using polymeric hollow filling bodies with addition quantities in wt. %

| Raw material | Ex 9 | Ex 10 | Ex 11 | Ex 12 | Ex 13 | Ref 2 | Ref 3 |
|---|---|---|---|---|---|---|---|
| Thioplast ® G 10 | 50.11 | 55.65 | 55.38 | 54.01 | 74.78 | 54.01 | 55.80 |
| Thiokol ® LP 33 | 20.00 | 19.95 | 19.85 | 19.36 | — | 19.36 | 20.00 |
| TPTMP | — | — | — | — | 0.28 | — | — |
| Methylon Resin 75108 | 1.62 | 1.62 | 1.61 | 1.57 | 1.60 | 1.57 | 1.62 |
| Nafturan ® 8187 | 1.00 | 1.30 | 1.49 | 1.45 | 1.64 | 1.45 | 1.50 |
| Expancel ® 551 DE 20 | 0.78 | 1.60 | — | — | 1.68 | — | — |
| Expancel ® 461 DE | — | — | 1.69 | — | — | — | — |
| Dualite ® 6033 | — | — | — | 4.13 | — | — | — |
| Dualite ® 6032 | — | — | — | — | — | 4.13 | — |
| Expancel ® 091 DE | — | — | — | — | — | — | 0.75 |
| Winnofil ® SPT | 16.20 | 18.42 | 18.33 | 17.88 | — | 17.88 | 18.87 |
| Polcarb ® S | — | — | — | — | 18.29 | — | — |
| Aerosil ® R 202 | 1.40 | 1.46 | 1.45 | 1.41 | 1.78 | 1.41 | 1.46 |
| Water | — | — | 0.20 | 0.19 | — | 0.19 | — |

TPTMP = trimethylol propane trimercaptopropionate, mercapto-functional crosslinker.

TABLE 7

Results of the measurements on the reacted sealing compositions, which were manufactured according to the formulations of table 6

| Test | Ex 9 | Ex 10 | Ex 11 | Ex 12 | Ex 13 | Ref 2 | Ref 3 |
|---|---|---|---|---|---|---|---|
| Density [g/cm³] | 1.29 | 1.09 | 1.08 | 1.15 | 1.09 | 1.12 | 1.06 |
| Tensile strength [N/mm²] | 2.64 | 2.55 | 2.26 | 2.21 | 2.07 | 1.58 | 1.80 |
| Elongation [%] | 389 | 307 | 280 | 275 | 472 | 286 | 426 |
| Peel 14 d RT [N/25 mm] | 209 | 125 | 97 | 94 | 204 | 209 | 254 |

A connection was observed between the particle size of the lightweight fillers and the mechanical properties of the sealing compositions manufactured with them. Thus it was found that a reduction in the average particle size is accompanied by an increase in the tensile strength. The average particle size of the hollow filling bodies preferably does not exceed 40 μm. The proportion and type of the hollow filling bodies and the mineral fillers have a substantial influence on the mechanical properties.

Surprisingly, cured sealing compositions could be manufactured that have excellent mechanical properties and nevertheless an extremely low density, in some cases of less than 1.2 g/cm³.

The invention claimed is:

1. A sealing composition of low density and increased tensile strength comprising a sulfur-containing polymer, the sealing composition having a cured density of no more than 1.3 g/cm³ determined according to ISO 2781 and a cured tensile strength of at least 1.9 N/mm² according to ISO 37, whereby the sealing composition has been prepared from a base composition containing at least two base polymers that are polysulfides, wherein the base composition comprises a) at least one sulfur-containing long-chain liner polymer with a chain length in the range approximately of 1500 to 5000 g/mol and b1) at least one sulfur-containing short-chain branched polymer with a chain length in the range approximately of 500 to 2000 g/mol which has a content of trifuntional molecules or b2) at least one polyfunctional crosslinker with a number of functional groups n is greater than or equal to 3 or a combination of b1) and b2), wherein the sealing composition does not include an epoxidated polysulfide.

2. A sealing composition according to claim 1, wherein the sealing composition has a peel strength of at least 90 N/25 mm.

3. A sealing composition according to claim 1, wherein the sealing composition further comprises hollow filling bodies in the range of 0.3 to 10 wt. %.

4. A sealing composition according to claim 1, further comprising a lightweight polymeric strength-increasing filler.

5. A sealing composition according to claim 1 having a density of not greater than 1.30 g/cm³.

6. A sealing composition according to claim 1 further comprising hallow filling bodies With an average diameter of not greater than 50 μm.

7. A sealing composition according to claim 1, further comprising hollow filling bodies have a true density in the range of 0.001 to 0.8 g/cm³.

8. A sealing composition according to claim 1, further comprising a polymeric filler powder having a true density in the range of 0.5 to 1.5 g/cm³.

9. A sealing composition according to claim 1, further comprising an inorganic filler powder having a true density in the range 0.18 to 4.5 g/cm³.

10. A sealing composition according to claim 1, further comprising a corrosion inhibitor.

11. A sealing composition according to claim 1 having low-temperature flexibility at −55° C. determined according to ISO 1519.

12. A sealing composition according to claim 1 having a peel strength of the cured sealing composition of at least 120 N/mm$^2$ after one thousand hours immersion in de-ionised water at 35° C., determined according to AITM 2-0013.

13. A sealing composition according to claim 1 having a peel strength of the cured sealing composition of at least 120 N/mm$^2$ after three periods of one hundred hours each of immersion in jet fuel DERD 2494 at 100° C. as determined according to AITM 2-0013.

14. A sealing composition according to claim 1, wherein the sealing composition fulfills all requirements of the specifications AIMS-04-05-001 and AIMS-04-05-012.

15. A base composition based on sulfur-containing polymers for the manufacture of a sealing composition comprising at least one linear polysulfide with a chain length in the range approximately of 1500 to 5000 g/mol and at least one short-chain branched polysulfide or a polythioether or a combination of these with a chain length in the range approximately of 500 to 2000 g/mol, which has a content of trifunctional molecules in particular in the range of 0.1 to 5 mol. % and at least one polyfunctional crosslinker with a number of functional groups n is greater than or equal to 3, wherein the sealing composition does not include an epoxidated polysulfide.

16. A base composition based on sulfur-containing polymers for the manufacture of a sealing composition according to claim 15, wherein, before the addition of a hardener, the base composition has a density value of no more than 1.285 g/cm$^3$.

17. A base composition according to claim 15, comprising a proportion of hollow filling bodies in the range of 0.3 to 10 wt. %.

18. A base composition according to claim 15, comprising a lightweight polymeric strength-increasing filler.

19. A base composition according to claim 15, having a density of no more than 1.285 g/cm$^3$.

20. A base composition according to claim 15, further comprising hollow filling bodies with an average diameter of no more than 50 µm.

21. A base composition according to claim 15, comprising the hollow filling bodies have a true density in the range of 0.001 to 0.8 g/cm$^3$.

22. A base composition according to claim 15, comprising polymeric filler powders having a true density in the range of 0.5 to 1.5 g/cm$^3$.

23. A base composition according to claim 15, further comprising inorganic filler powder having a true density in the range of 0.18 to 4.5 g/cm$^3$.

24. A base composition according to claim 15, further comprising a corrosion inhibitor.

25. A process for the manufacture of a sealing composition according to claim 1 comprising:
mixing at least two base polymers that are polysulfides wherein the at least two compositions comprise a) at least one sulfur-containing long-chain linear polymer with a chain length in the range approximately of 1500 to 5000 g/mol and b1) at least one sulfur-containing short-chain branched polymer with a chain length in the range approximately of 500 to 2000 g/mol which has a content of trifunctional molecules or b2) at least one polyfunctional crosslinker with a number of functional groups n is greater than 3 or a combination of b1) and b2) with a number of functional groups n is greater than or equal to 3, wherein the sealing composition does not include an epoxidated polysulfide; with
at least one adhesion promoter, and
adding at least one lightweight filler to the mixture under a vacuum with a residual pressure of less than 50 mbar.

26. The process for the manufacture of a sealing composition according to claim 25, wherein the lightweight filler is worked in in a vacuum dissolver at a peripheral toothed disc speed in the range of at least 2 m/s.

27. A process for the manufacture of a sealing composition according to claim 25, wherein additional components of the sealing composition are introduced and intermixed.

28. A process for the manufacture of a sealing composition according to claim 25, said lightweight filler powder has an average particle size of no more than 30 µm.

29. A process for the manufacture of a sealing composition according to claim 25, wherein the at least one linear polysulfide with a chain length in the range of about 1500 to 5000 g/mol, is mixed with a short-chain branched polysulfide with a chain length in the range of about 500 to 2000 g/mol, which has a content of trifunctional molecules in particular in the range of 0.1 to 5 wt. % and with at least one polyfunctional crosslinker with a number of functional groups n is greater than or equal to 3, wherein the sealing composition does not include an epoxidated polysulfide.

30. A sealing composition according to claim 6, wherein the sealing composition has a peel strength at lest 125N/25 mm.

31. A sealing composition according to claim 1, consisting of a sulfur-containing polymer, the sealing composition having a cured density of no more than 1.3 g/cm$^3$ determined according to ISO 2781 and a cured tensile strength of at least 1.9 N/mm$^2$ determined according to ISO 37 to ISO 37, whereby the sealing composition has been prepared from a base composition consisting of least two base polymers that are polysulfides selected, wherein the base composition comprises a) at least one sulfur-containing long-chain linear polymer with a chain length in the range approximately of 1500 to 5000 g/mol and b1) at least one sulfur-containing short-chain branched polymer with a chain length in the range approximately of 500 to 2000 g/mol which has a content of trifunctional molecules or b2) at least one polyfunctional crosslinker with a number of functional groups n is greater than or equal to 3 or a combination of b1) and b2).

32. A base composition based on sulfur-containing polymers for the manufacture of a sealing composition comprising a base polymer comprising:
at least one long-chain linear polysulfide with a chain length in the range of about 1500 to 5000 g/mol in combination with at least one short-chain branched polysulfide with a chain length in the range of about 500 to 2000 g/mol that comprises at least one of a trifunctional or higher-functional molecule, and optionally at least one polyfunctional crosslinker having the number of functional groups n greater than or equal to 3, but not an epoxidated polysulfide, and at least one of a hollow filling body or a lightweight polymeric strength-increasing filler.

33. A base composition according to claim 32, wherein it has a density value of not more than 1.285 g/cm$^3$ before the addition of a hardener.

34. A base composition according to claim 32, comprising from 0.3 to 10 wt. % hollow filling bodies.

35. A base composition according to claim 32, wherein the at least one short-chain, branched polysulfide has a content of trifunctional molecules in the range of 0.1 to 5 mol. %.

36. A base composition according to claim 32, wherein, without hollow filling bodies, it has a density of not more than 1.285 g/cm$^3$.

37. A base composition according to claim 32, wherein the hollow filling bodies have an average diameter of not more than 50 μm.

38. A base composition according to claim 32, wherein the hollow filling bodies have a true density in the range of 0.001 to 0.8 g/cm$^3$.

39. A base composition according to claim 32, wherein the polymeric filler bodies have a true density in the range of 0.5 to 1.5 g/$^3$.

40. A base composition according to claim 32, wherein the inorganic filler bodies have a true density in the range of 0.18 to 4.5 g/cm$^3$.

41. A base composition according to claim 32, further comprising a corrosion inhibitor.

42. A low-density, high-tensile-strength sealing composition based on sulfur-containing polymers, manufactured from a base composition according to claim 32 by mixing with hardener and having a density after curing of not more than 1.3 g/cm$^3$ determined according to ISO 2781, a tensile strength of at least 1.9 N/mm$^2$ determined according to ISO 37 and a peel strength of at least 125 N/25 mm determined according to AITM 2-0013 with stainless-steel wire fabric.

43. A sealing composition according to claim 42, wherein it has a proportion of hollow filling bodies such as e.g. polymeric hollow spheres in the range of 0.3 to 10 wt. %.

44. A sealing composition, according to claim 42, wherein it contains a proportion of lightweight polymeric strength-increasing filler such as e.g. polyamide, polyethylene, polypropylene.

45. A sealing composition according to claim 42, wherein, without a proportion of hollow filling bodies, it has a density of not more than 1.30 g/cm$^3$.

46. A sealing composition according to claim 42, wherein it has hollow filling bodies with an average diameter of not more than 50 μm, in particular of not more than 30 μm.

47. A sealing composition according to claim 42, wherein the hollow filling bodies have a true density in the range of 0.001 to 0.8 g/cm$^3$.

48. A sealing composition according to claim 42, wherein the polymeric filler powders have a true density in the range of 0.5 to 1.5 g/cm$^3$.

49. A sealing composition according to claim 42, wherein the inorganic filler powders have a true density in the range of 0.18 to 4.5 g/cm$^3$.

50. A sealing composition according to claim 42, wherein it additionally contains a corrosion inhibitor, in particular a chromate-free corrosion inhibitor.

51. A sealing composition according to claim 42, wherein it fulfils low-temperature flexibility at −55° C. determined to ISO 1519.

52. A sealing composition according to claim 42, wherein it has a peel strength of the cured sealing composition of at least 120 N/mm$^2$ after immersion in demineralised water for on one thousand hours at 35° C. determined to AITM 2-0013.

53. A sealing composition according to claim 42, wherein it has a peel strength of the cured sealing composition of at least 120 N/mm$^2$ after three periods of one hundred hours each of immersion in jet fuel DERD 2494 at 100° C., determined to AITM 2-0013.

54. A sealing composition according to claim 42, wherein it fulfils all requirements of the specifications AIMS-04-05-001 and AIMS-04-05-012.

55. A process for the manufacture of a sealing composition according to claim 42, comprising mixing at least one base polymer according to claim 32 with at least one adhesion promoter and adding the at least one lightweight filler under a vacuum with a residual pressure of less than 50 mbar.

56. A process for the manufacture of a sealing composition according to claim 55 wherein the lightweight filler is incorporated in a vacuum dissolver at a peripheral speed of the toothed disc in the range of at least 2 m/s.

57. A process for the manufacture of a sealing composition according to claim 55 wherein the other components of the sealing composition are then incorporated and intermixed.

58. A process for the manufacture of a sealing composition according to claim 55, wherein the lightweight filling bodies and optionally also fillers with an average particle size of not more than 30 μm in order to achieve better spreadability and mouldability of the sealing composition during working.

59. A process for the manufacture of a sealing composition according to claim 55 wherein the base polymer includes at least one long-chain linear polysulfide with a chain length in the range of about 1500 to 5000 g/mol is mixed with at least one short-chain branched polysulfide with a chain length in the range of about 500 to 2000 g/mol, which has a content of trifunctional and/or higher-functional molecules, in particular in the range of 0.1 to 5 wt. %, and optionally with at least one polyfunctional crosslinker having the number of functional groups n≧3.

60. An air or a space craft, a motor vehicle, a rail vehicle, a ship, engineering equipment or furniture comprising the composition of claim 32.

* * * * *